Sept. 23, 1958  R. B. IMMEL  2,853,660
DUST-TIGHT D. C. MAGNET ASSEMBLY
Filed Jan. 14, 1955  2 Sheets-Sheet 1

INVENTOR
Ralph B. Immel
BY
Paul E. Friedemann
ATTORNEY

Sept. 23, 1958  R. B. IMMEL  2,853,660
DUST-TIGHT D. C. MAGNET ASSEMBLY
Filed Jan. 14, 1955  2 Sheets-Sheet 2

United States Patent Office 2,853,660
Patented Sept. 23, 1958

2,853,660

DUST-TIGHT D. C. MAGNET ASSEMBLY

Ralph B. Immel, Williamsville, N. Y., assignor to Westinghouse Electric Corporation, East Pittsburgh, Pa., a corporation of Pennsylvania Application January 14, 1955, Serial No. 481,815

6 Claims. (Cl. 317—191)

This invention relates to electromagnets and, more particularly, to dust-proof solenoids.

An object of the invention is to provide a solenoid embodying means for excluding foreign material from the interior of the solenoid.

Another object of the invention is to provide a solenoid embodying means for sealing the ends of the solenoid and means for guiding the solenoid armature centrally to prevent it from engaging any of the stationary parts.

Another object of the invention is to provide a dust-proof solenoid embodying guide means guiding both ends of the moving armature so that the armature moves free of the fixed parts of the solenoid.

Another object of the invention is to provide an improved dust-proof solenoid embodying guide levers for guiding both ends of the moving armature, the guide levers being provided with knife-edge bearings both at their pivot points and at the points of engagement with the moving armature to minimize friction.

Another object of the invention is to provide a dust-proof solenoid according to the preceding paragraphs in which means is provided for reversing the direction of the operating stroke of the moving armature.

The invention, both as to structure and operation, together with additional objects and advantages thereof, will be best understood from the following detailed description thereof when read in conjunction with the accompanying drawings.

Figure 1:
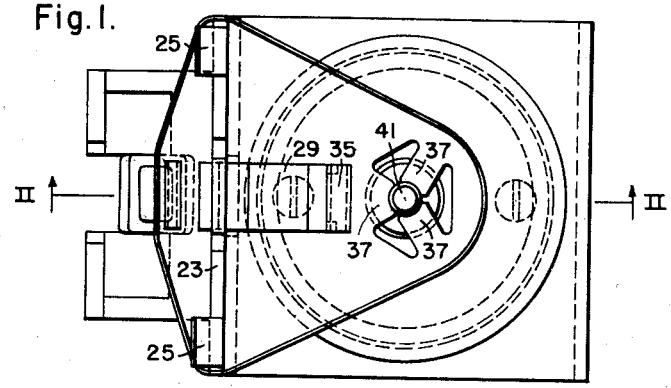
Figure 1 is a top plan view of a solenoid embodying the principles of the invention.
Figure 2:
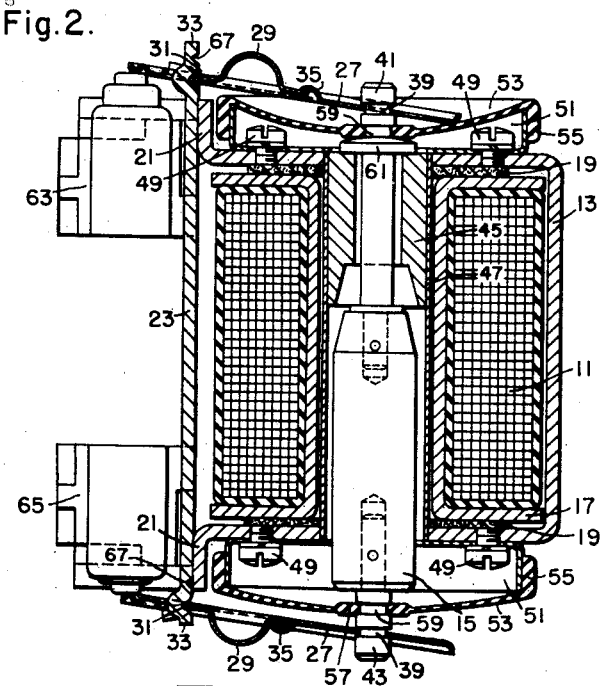
Fig. 2 is a vertical sectional view taken substantially on line II—II of Fig. 1 and looking in the direction indicated by the arrows.
Figure 3:
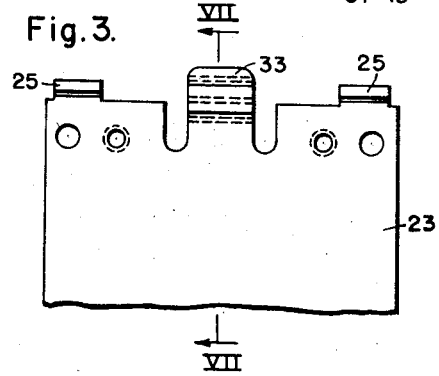
Fig. 3 is an elevational view of a part of the bearing plate for supporting the guide levers and the biasing spring for said levers.
Figure 4:
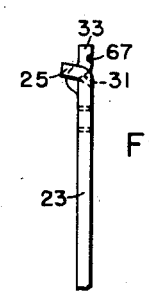
Fig. 4 is an end elevational view of the bearing plate shown in Fig. 3.
Figure 5:
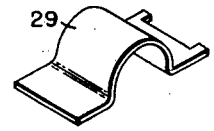
Fig. 5 is a perspective view of one of the guide lever springs.
Figure 6:
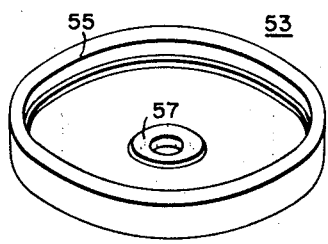
Fig. 6 is a perspective view of one of the dust caps.
Figure 7:
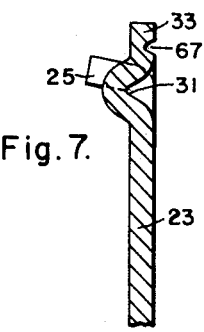
Fig. 7 is an enlarged sectional view of the bearing plate taken on line VII—VII of Fig. 3 and looking in the direction indicated by the arrows.

Referring to Fig. 2 of the drawings, the solenoid comprises generally an energizing coil 11, a fixed U-shaped magnet yoke 13 and a moving armature 15. The coil 11 is mounted on an insulating spool 17 which is supported between the upper and lower legs of the magnet yoke 13 with resilient insulating washers 19 disposed between the ends of the spool 17 and the legs of the magnet yoke. The legs of the magnet yoke 13 are provided with mounting feet 21 on which is mounted a bearing plate 23 having projections 25 at the upper and lower ends thereof for supporting upper and lower operating levers 27, the purpose of which is to support and guide the moving armature 15. The operating levers 27 are provided with rectangular openings which fit over the projections 25, the left hand edges of which openings are biased by means of leaf springs 29 against the bearing plate 23 and form knife-edge bearings for the operation of the levers. The springs 29 are mounted in compression between a notch 31 formed in central projections 33 on the bearing plate 23 and a formed portion 35 on the operating lever 27. The force of the spring 29 is exerted on the bearing line of the lever 27 so that it does not add any load to the solenoid armature.

Each of the operating levers 27 is formed to provide three inwardly extending fingers 37 which are forced over the ends of studs 41 and 43 and cooperate with notches 39 in non-magnetic upper and lower studs 41 and 43, respectively, to form knife-edge bearings for connecting the opposite ends of the armature 15 to the operating levers.

The upper stud 41, which is considerably longer than the lower stud 43, extends downwardly through an axial opening in a fixed core member 45 and threadedly engages in a tapped opening in the upper end of the armature 15. Similarly, the shorter lower stud 43 threadedly engages in an opening in the lower end of the armature 15. Thus, the armature 15 is supported at both ends and is guided by the lever 27 for substantially straight-line movement in a non-magnetic guide tube 47.

Mounted by means of screws 49 on the outer sides of the upper and lower legs of the magnet yoke 13 are cup-shaped members 51 on which are mounted flexible dust caps 53. The dust cap has a thick annular flange 55 which fits tightly over the flange of the cup-shaped member and the body portion tapers in thickness toward the center. The thick central portions 57 of the dust caps 53 are provided with openings which are snapped over the ends of the studs 41 and 43 until they are seated tightly in grooves 59 in the studs. In this manner the solenoid is sealed against dust. A collar 61 on the upper stud 41 in the deenergized condition of the solenoid rests on the fixed core member 45 thus limiting the downward movement of the armature 15.

The left hand ends of the upper and lower operating levers 41 and 43, respectively, engage the push buttons of switches 63 and 65 mounted on the bearing plate 23 and operate the switches upon operation of the solenoid.

Figure 8:
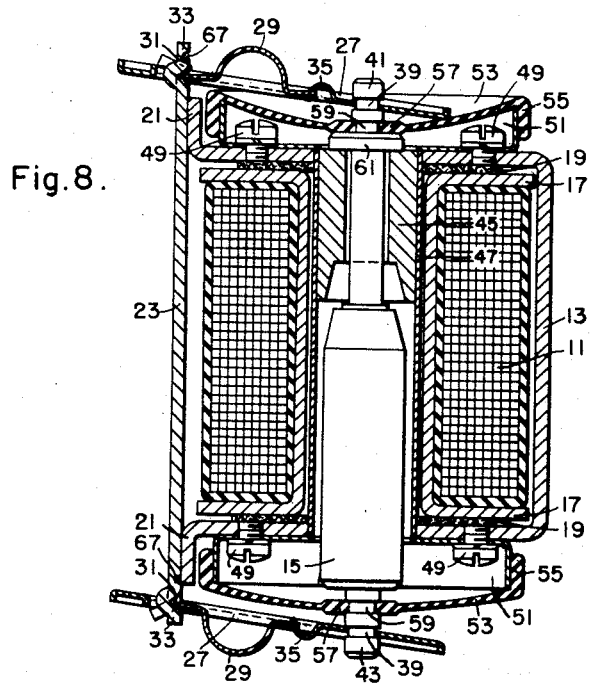
Fig. 8 is a vertical sectional view of the solenoid assembled for upward operation of the armature.
Figure 9:
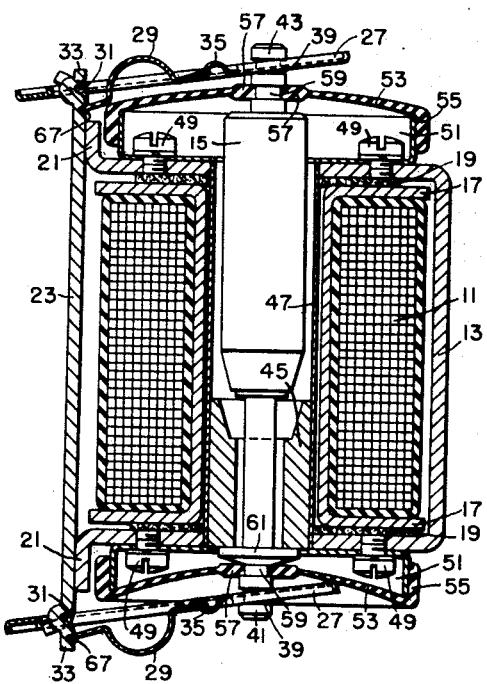
Fig. 9 is a vertical sectional view of the solenoid assembled for downward operation of the armature.

Figure 9 illustrates the solenoid arranged so that the armature is biased upwardly and moves down upon energization of the solenoid. In this arrangement, the solenoid is inverted from the Fig. 8 position and the left ends of the springs 29 are seated in notches 67 in the bearing plate instead of the notches 31. As shown in Fig. 9, the notches 67 are offset below the notches 31 and from the bearing line of the levers 27. In this position (Fig. 9) the springs 29 bias the levers 27 and the armature 15 to their upper position and restore them to the upper position upon deenergization of the solenoid. By this arrangement, the operating stroke of the armature is reversed.

It will be seen that the invention provides a dust-proof solenoid in which the moving armature is guided in its operation by guide levers connected to opposite ends of the armature. The operating levers constrain the armature for movement substantially in a straight line and prevent it from being pulled to one side against the inner tube thus reducing friction to a minimum. Means is also provided for changing the direction of the operating stroke of the armature.

Having described the invention in accordance with the provisions of the patent statutes, it is to be understood that various changes and modifications may be made therein without departing from the spirit of the invention.

I claim as my invention:

1. An electromagnetic device comprising a U-shaped magnet yoke, an energizing winding supported in said U-shaped magnet yoke, an armature movable within said winding, resilient means supported at the ends of said magnet yoke and sealing the ends of said electromagnetic device, and a pivoted lever at each end of said electromagnetic device for supporting and guiding said armature.

2. An electromagnetic device comprising a U-shaped magnet yoke, an energizing winding, an armature movable within said winding, resilient means at opposite ends of said U-shaped magnet yoke sealing said electromagnetic device, members on the legs of said U-shaped magnet yoke supporting said resilient means, a pair of levers disposed one at each end of said U-shaped magnet yoke and having connections to opposite ends of said armature supporting said armature for substantially straight line movement, knife-edge bearing means for said levers, and spring means biasing said levers into engagement with said bearing means.

3. An electromagnetic device comprising a magnet yoke, an energizing winding, an armature movable within said winding, said armature having a projection on each end thereof, cup-shaped members mounted on the ends of said magnet yoke, resilient caps mounted on said cup-shaped members and engaging the projections on said armature to seal said electromagnetic device, and a lever pivotally mounted at each end of said electromagnetic device, said levers being connected to said projections at opposite ends thereof for supporting and guiding said armature.

4. An electromagnetic device comprising a magnet yoke, an energizing winding, an armature movable within said winding, said armature having a projection on each end thereof, cup-shaped members mounted on the ends of said magnet yoke, resilient caps mounted on said cup-shaped members and engaging the projections on said armature to seal said electromagnetic device, and a lever pivotally mounted at each end of said electromagnetic device, said levers being connected to said projections at opposite ends thereof outside said resilient caps for supporting and guiding said armature.

5. An electromagnetic device comprising a U-shaped magnet yoke, an energizing winding, an armature movable within said winding, projections on the ends of said armature extending axially beyond the legs of said magnet yoke, a lever pivoted at each end of said electromagnetic device, means on said levers forming knife-edge bearings engaging said projections for supporting and guiding said armature, cup-shaped members on the legs of said U-shaped magnet yoke, and resilient means engaging said cup-shaped members and also engaging said projections to seal said electromagnetic device.

6. An electromagnetic device comprising a U-shaped magnet yoke, an energizing winding, an armature movable within said winding, resilient means at opposite ends of said U-shaped magnet yoke sealing said electromagnetic device, a pair of levers disposed one at each end of said U-shaped magnet yoke, said levers having connections with opposite ends of said armature for supporting said armature for substantially straight line movement, bearing means pivotally supporting said levers, spring means biasing said levers, and said spring means being adjustable to vary the direction of bias applied by said spring means to said levers.

References Cited in the file of this patent

UNITED STATES PATENTS

| | | |
|---|---|---|
| 2,427,630 | Snyder | Sept. 16, 1947 |
| 2,435,817 | Boynton | Feb. 10, 1948 |
| 2,515,259 | O'Brien | July 18, 1950 |